United States Patent [19]

Tjugum

[11] Patent Number: 5,681,386
[45] Date of Patent: *Oct. 28, 1997

[54] METHOD FOR BLENDING OF ADMIXTURES IN A SPRAYED CONCRETE MASS AND AGENT FOR APPLICATION OF THE METHOD

[75] Inventor: Odd Tjugum, Dal, Norway

[73] Assignee: MBT Holding AG, Zurich, Switzerland

[ * ] Notice: The term of this patent shall not extend beyond the expiration date of Pat. No. 5,494,516.

[21] Appl. No.: 469,536

[22] Filed: Jun. 6, 1995

Related U.S. Application Data

[63] Continuation of Ser. No. 87,685, Jan. 12, 1994, abandoned.

[30] Foreign Application Priority Data

Jan. 8, 1991 [NO] Norway ............................... 91 0082

[51] Int. Cl.$^6$ ............................................. C04B 24/00
[52] U.S. Cl. .................. 106/819; 106/802; 106/805; 106/808; 106/809; 106/823; 106/822; 427/397.7; 427/427; 524/650
[58] Field of Search ........................... 106/638, 802, 106/805, 810, 819, 823, 804, 822, 809, 808; 427/397.7, 426, 427; 524/650

[56] References Cited

U.S. PATENT DOCUMENTS

| | | | |
|---|---|---|---|
| 4,069,062 | 1/1978 | Burge | 106/805 |
| 4,263,346 | 4/1981 | Sandell | 427/426 |
| 4,391,645 | 7/1983 | Marcellis et al. | 106/823 |
| 4,433,731 | 2/1984 | Chatterji et al. | 106/805 |
| 4,676,832 | 6/1987 | Childs et al. | 106/823 |
| 4,746,364 | 5/1988 | Kawai et al. | 106/805 |
| 4,746,367 | 5/1988 | Meyer | 106/823 |
| 4,961,790 | 10/1990 | Smith et al. | 106/819 |
| 5,085,708 | 2/1992 | Moriya et al. | 106/802 |
| 5,494,516 | 2/1996 | Drs et al. | 106/819 |

FOREIGN PATENT DOCUMENTS

| | | |
|---|---|---|
| 0 208 535 | 1/1987 | European Pat. Off. . |
| 58-161953 | 9/1983 | Japan . |
| 59-109662 | 6/1984 | Japan . |
| 1507661 | 4/1978 | United Kingdom . |
| 1596212 | 8/1981 | United Kingdom . |

OTHER PUBLICATIONS

Kosmatka et al., "Design & Control of Concrete Mixtures", Thirteenth Edition, PCA 1988, pp. 64, 65, 67, 95 (no month).
Patent Abstracts of Japan, vol. 13, No. 134, C–581, Abstract of JP, A, 63–297255, Dec. 5, 1988.
Patent Abstracts of Japan, vol. 14, No. 261, 6–725, Abstract of JP, A, 2–74547, Mar. 14, 1990.

*Primary Examiner*—Michael Marcheschi
*Attorney, Agent, or Firm*—Carol A. Loeschorn; Andrew N. Parfomak

[57] ABSTRACT

In a method for blending of admixtures in a concrete mass which is transported through pipes/hoses to a casting site and in which the mass shall have a consistency which is suitable for casting of the mass on wall or roof surfaces there are used admixtures consisting of two components which react with each other. The two components are mixed into the mass at different points in time, possibly in combination with normally used additional admixtures for the mass.

5 Claims, No Drawings

METHOD FOR BLENDING OF ADMIXTURES IN A SPRAYED CONCRETE MASS AND AGENT FOR APPLICATION OF THE METHOD

This is a continuation of application Ser. No. 08/087,685, filed Jan. 12, 1994, now abandoned.

The invention concerns a method for blending of admixtures in a pouring mass which is transported to site and where the mass should have a consistency which is suitable for casting of the mass on a base of concrete, steel or other material construction, for repair, reinforcement, protection, sealing against water or other purposes. The invention also concerns an agent which is suitable for application of the method.

When spraying compounds on wall and roof surfaces, a predominant problem is to make the sprayed mass adhere to the surfaces, while at the same time the mass has a consistency which enables it to be sprayed. This problem applies particularly in cases of spraying of coats which have to have a certain thickness, the major working area in which this kind of spraying is used being concrete, mortar and plaster spraying. A similar spraying technique is also used, although to a lesser degree, on other materials, such as filling masses, plastic masses, etc. The following description, however, is based on the most common example, viz. concrete spraying; shotcreting.

Sprayed concrete pouring is a technique whereby in one and the same operation a concrete mass is fed to a spray nozzle from which the concrete is sprayed on to a surface where it sets almost immediately and forms the required concrete coating. It is transported via hoses or pipes either by pumping of a ready-mixed concrete (the wet method) or by transporting premixed dry concrete (without water) by compressed air (the dry method). Immediately after the concrete leaves the hose, it will be intercepted and deposited against one side of formwork or a base.

When the concrete meets the base, it is vital that it should stick as the thickness of the concrete increases. The concrete must be sprayed firmly against the base and must be cohesive so that it is possible to spread it out in the required thickness. A vertical surface coating is simple to perform, but in the case of thick layers, rejection can easily occur in the mass. When spraying concrete according to the wet method, the mass which is sprayed out must fulfil two conditions, viz. it must be easy to pump and must be adhesive as it leaves the nozzle.

In order to obtain this kind of quality, a number of admixtures are used for concrete. If it is to be fed through pipes and hoses, concrete must have a certain consistency which in practice prevents it from sticking to the base. To achieve the desired effect with regard to fixing and attachment to the base, accelerators are added to the mass, either before it is transported through the tubes or pipes, or preferably by adding the accelerator in the spray nozzle. The accelerator will cause an increase in the rate of hardening of the concrete, so that it will be vital to use the correct amounts. Alternatively, thickeners are added to the spray concrete, primarily of the type which react with water or the binding agent, i.e. the cement. One problem with introduction in the nozzle is that the distribution of accelerator can be uneven, which results in poor quality. Another problem with the addition of accelerator is that it will reduce the compressive strength of the concrete and thus reduce the quality of the end product.

When spraying masses on wall and roof surfaces, a problem thus arises with regard to the addition of substances, both in the correct quantities and to some extent also in adding the correct substances. For example, when adding water-reducing agents, the slump of the concrete will increase and the mixture will be easier to pump, but will not adhere so easily to the base and rejection can easily occur in the mass as the thickness increases. If water is added, the quality of the concrete will decrease and more cement will have to be used, which will add to the cost and is not always desirable with regard to the quality of the end product. The use of accelerators which are added to the mass in a nozzle will lead to a reduction in the strength of the end product. There is, moreover, the disadvantage that the mass will harden directly after application, thus making further treatment extremely difficult. Similar problems also arise in the application of spray masses other than concrete, particularly cement-based masses.

One solution which has been considered is to add several substances simultaneously, so that the mass to be sprayed has both good pumping properties as well as good hardening properties, but this has been impossible to achieve as the substances affect one another, i.e. react with one another and neutralize the respective desired effects and to some extent have made application impossible. This has therefore not been a solution to the problems.

The object of the present invention is to find an admixture which does not affect the concrete mass, i.e. the binding agent in the concrete, such as cement, but which nevertheless produces the required binding effect to the base surface and the actual concrete mass, and the desired hardening during and after application. The object, therefore, is to provide a method for the addition of substances to the spray mass, together with agents suitable for this purpose which make it possible to transport the spray mass through pipes and hoses in an optimal manner and allow the mass to set so quickly that rejection and drop-out are prevented, while at the same time retaining a consistency which enable it to be treated and possibly smoothed and/or dressed.

The invention also concerns the application of admixtures to improve the consistency of concrete masses, plastering or filling masses.

In connection with the invention the surprising discovery has been made that with a two-component admixture, in which the reaction between the two components gives the desired effect of improving consistency and in which the components react with each other, but not with the mass, in other words independently of the binding agent in the mass, especially cement in these masses, it has become possible to add substances which both give the desired fluidity, and particularly increased pumpability, during transport, while at the same time the quality of the concreted coating mass is retained. This can be achieved despite the fact that components of this type are not traditionally used in combination. This has been made possible by the fact that the components are added at different points in time and that they only react with each other, but not necessarily with the mass in addition to the agents in accordance with the invention, other conventional admixtures can also be added, such as accelerators which react with the binding agent in the mass, e.g. cement, and have a further effect.

For example, a component can be added which increases the slump of a concrete mixture, e.g. a water reducing agent and/or superplasticizer and as the other component a substance which neutralizes the effect of the water reducing agent and effects a rapid change in the consistency together with hardening. At the same time, an accelerator, fiber, silica, etc. can also be added in quantities which do not cause an inadmissable reduction in the quality of the concrete, but on the contrary improve its quality. Such extra admixtures can be added separately or mixed directly with one or distributed between both components, in that admixture can be performed both during mixing or during the spraying of the mass. Such combinations and mixtures of the two components can be in the form of liquid solutions or mixtures or as mixtures of powders.

It is advantageous to add one component directly to the concrete or spray mass, while the other component is added in the nozzle under pressure, or together with pressurized air and the other admixtures. The sequence, however, is immaterial since all that matters is that the substances should not be added simultaneously, so that the reaction between the components of the substances does not occur until the moment of casting. Thus all the side-effects of reactions between the substances during transport are avoided and, as it is the reaction between the components which causes adhesion to the surface, it will also be possible to adjust its strength by means of the admixtures, while the quality of the concrete remains unaffected, or only affected in the desired direction by means of a smaller admixture of accelerator, silica or the like.

As components in the agent in accordance with the invention, substances are used which are recognized admixtures for cement, mortar and concrete. The components act together as a flocculant, coagulant and/or association compound or as a gelling agent. For one component, substances are chosen from water-soluble synthetic and natural organic polymers of cellulose (ether) derivatives, including methylcellulose, carboxylic methylcellulose, hydroxyethylcellose, methyl and hydroxypropyl methylcellulose, polyvinyl alcohol, polyethylene oxide, polyacrylamides, alginates and derivatives of these, in that substances from the above-mentioned groups can be combined as components.

As the other component, recognized water reducing, dispersant and/or super-wetting admixtures for cement, mortar and concrete are chosen, e.g. lignin derivatives, sulphonated condensation derivatives between melamine, naphthalene and formalin, and/or recognized retarders based on carboxylic acid derivatives, phosphates, etc. One component can be added in dosing quantities, calculated as a percentage of, e.g., cement weight and 0.005–0.5%, calculated as active pure solid matter. The other component can be added with advantage in dosing quantities of 0.05–5% based on the same calculations. In practice the substances will be added to the combination and then preferably mixed with recognized admixtures for concrete. These mixtures can be in powder or liquid form after mixing.

The substances in one component can be described as stabilizing, gelling, water retarding, viscosity adjusting, with a thixotropic effect, primarily aimed at improving workability, pumpability, etc. The invention is particularly applicable when adding admixtures in order to improve the consistency of a concrete spray mass, but since the agents mainly react with each other and not with the actual spray mass, the agents will also be able to be used in connection with plaster masses or spraying of fillers, in that case without cement.

When using the method in connection with a concrete mass, it is advantageous to use a dry mass into which one component is introduced and mixed with water in a continuous stream through a flow mixer or other mixer, or the mass is mixed on site, in which case a ready-mixed mass is used, e.g. pre-mixed concrete, but in such a way that both components are added at the casting site, but at different points in the process.

The consistency of the concrete mass can be further regulated/adjusted by allowing the mass to become harsher, primarily by reducing the slump of the concrete, in that the effect of wetting admixtures, especially superplasticizers, is reduced or eliminated.

The relative proportions of the two components can be adjusted in order to regulate the consistency of the spray mass or pouring mass to the required value. Many modifications as well as other areas of application will be possible within the framework of the invention. Concrete applied by means of the method according to the invention will be able to be dressed after spraying and it will be possible to regulate the softness of the concrete. The method will also be applicable for dry spraying, and not only for the wet method.

EXAMPLE 1

Spraying concrete for rock support (wet method)

A mixture consisting of 410 parts of cement, 25 parts of silica fume, 1480 parts of sand (0–8 mm), 0.6% by weight (on cement) of stabilizer (phosphonic acid derivative), 2 parts of a combination of 20 parts of copolymer of styrene and maleic acid ester with 1.5 parts of poly(ethylene oxide) -Polyox WSR 301 of Union Carbide—1 part of lignosulphonate and water to achieve a ratio of 0.5 (water/cement & sand) is made up and pumped in the usual manner through the hose to a nozzle where an activator combination consisting of 8 parts of sodium silicate (36% aqueous solution), 1 part of an aqueous solution (40%) of -naphthalene sulphonate-formaldehyde condensate and 1 part of water is added (3% by weight of cement).

The initial slump of 25 cm can be kept unchanged over 1 hours.

Nevertheless, the mixture can be sprayed in the usual manner with a reduced rebound and a high early strength within 2 hours.

EXAMPLE 2

Spraying fiber concrete

A mixture consisting of 450 parts of cement, 36 parts of silica fume, 1400 parts of sand (0–8 mm), 8 parts of the combination mentioned in Example 1, 50 parts of 40 mm fibers and water to achieve a ratio of water to cement and silica fume of 0.41 (W/C+S) is made up and pumped in the usual manner. In the nozzle 4% by weight of cement of the activator combination mentioned in Example 1 is added.

The use of this mixture reduced the high fiber rebound and increased the toughness I30.

EXAMPLE 3

Repair mortar for handspraying

| mix design: | |
|---|---|
| cement | 450.0 parts |
| silica fume (densified powder) | 25.0 parts |
| sand (Dmax 6 mm) | 1480.0 parts |
| lignosulfonate | 3.0 parts |
| stabilizer (phosphonic acid derivative) | 1.0 parts |
| combination of Example 1 | 4.0 parts |
| water/cement + silica fume | 0.45 |

The slump of 24 cm remained unchanged, when batching was performed during transport. Before spraying, 2% by weight of cement is added from the activator combination of Example 1.

EXAMPLE 4

Spraying mortar on a bob track

| | |
|---|---|
| cement | 400.0 kg |
| silica fume | 10.0 kg |
| sand (0–8 mm) | 1670.0 kg |
| polymer additive (3% of CW) (polyvinyl acetate powder) | 12.5 kg |
| polypropylene fibers | 1.0 kg |
| 18 mm steel fibers | 60.0 kg |
| combination of Ex. 1 | 8.0 kg |
| Stabilizer (phosphonic acid derivative - 0.6% CW) | 2.5 kg |
| water/cement + silica | 0.45 |

Add in nozzle activator of Ex. 1 (4% of C+S weight).

EXAMPLE 5

Shotcrete with a slump of 21 cm is prepared by mixing

| | |
|---|---|
| cement | 400.0 kg |
| silica fume | 30.0 kg |
| sand (0–8 mm) | 1700.0 kg |
| stabilizer (phosphonic acid derivative) | 2.8 kg |
| combination of Ex. 1 | 5.0 kg |
| water/cement + silica fume | 0.5 |

A 40% solution of -naphthalene sulphonate-formaldehyde condensate is added in the nozzle (1% of cement+silica fume weight).

The process enables spraying of thick layers on vertical substrate.

EXAMPLE 6

Plastering mortar containing

| | |
|---|---|
| cement | 200 kg/m$^3$ |
| sand (0–4 mm) | 1800.0 kg/m$^3$ |
| combination of Ex. 1 | 2.0 kg/m$^3$ |
| water/cement | 0.5 | has a good flowable consistency. When spraying, 1.5% of cement weight of the solution used in Example 5 is added in the spraying nozzle.

EXAMPLE 7

A flowable grouting/repair mortar is made up by mixing

| | |
|---|---|
| cement | 45.4 parts |
| sand | 48.7 parts |
| calcium oxide | 3.2 parts |
| silica fume | 2.0 parts |
| BNS* powder | 0.6 parts |
| antifoam agent | 0.1 parts |
| water/Cement + Silica fume | 0.5 | when spraying, 2% CW of a 1% solution of Polyox WSR 301 is added in the nozzle.

BNS is -naphthalene sulphonate-formaldehyde condensate.

EXAMPLE 8

Example 1 is repeated, but with 0.75 parts of the polyethylene oxide used in that example being replaced by 0.75 parts of hydroxyethyl cellulose.

The slump performance of the resulting composition is similar to that of the composition of Example 1.

I claim:

1. A method for transport and application of concrete to a substrate such that the concrete is flowable in transport but just prior to or upon application, the concrete undergoes a reduction in slump, comprising the steps adding to the concrete as a first addition one or more of a first admixture selected from the group consisting of: polyvinyl alcohol, polyethylene oxide, polyacrylamides, alginates, derivatives thereof, and water-soluble synthetic and natural organic polymers of cellulose (ether) derivatives; and adding as a later addition, a second admixture comprising at least one of water reducers, dispersants, superplasticizing admixtures or retarders.

2. A method according to claim 1 wherein said first addition is added to the concrete prior to transport and said later addition is added to the concrete just prior to application.

3. A method according to claim 1 wherein said first addition is added to concrete which is ready-mix concrete.

4. A method according to claim 2 wherein said first addition is added to concrete which is pre-mixed dry concrete.

5. A method according to claim 1 wherein said first admixture is a polyethylene oxide and said second admixture is a naphthalene sulphonate.

* * * * *